(12) United States Patent
Abbas et al.

(10) Patent No.: US 10,229,190 B2
(45) Date of Patent: Mar. 12, 2019

(54) LATENT SEMANTIC INDEXING IN APPLICATION CLASSIFICATION

(71) Applicant: Samsung Electronics Co., Ltd., Suwon-si, Gyeonggi-do (KR)

(72) Inventors: Abdelhalim Abbas, San Jose, CA (US); Eric Glover, San Francisco, CA (US); Kyle D. Ross, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1221 days.

(21) Appl. No.: 14/272,366

(22) Filed: May 7, 2014

(65) Prior Publication Data

US 2015/0186495 A1 Jul. 2, 2015

Related U.S. Application Data

(60) Provisional application No. 61/922,641, filed on Dec. 31, 2013.

(51) Int. Cl.
*G06F 17/30* (2006.01)

(52) U.S. Cl.
CPC .............................. *G06F 17/30687* (2013.01)

(58) Field of Classification Search
CPC ......... G06F 17/30705; G06F 17/30684; G06F 17/3069; G06F 17/30598; G06F 17/16; G06F 17/30687
USPC ............... 707/E17.09, 739, E17.08, E17.084
See application file for complete search history.

(56) References Cited

U.S. PATENT DOCUMENTS

| | | | |
|---|---|---|---|
| 7,797,282 B1* | 9/2010 | Kirshenbaum ... | G06F 17/30705 707/649 |
| 9,152,694 B1* | 10/2015 | Padidar ............ | G06F 17/30598 |
| 2006/0242140 A1* | 10/2006 | Wnek .................... | G06K 9/622 |
| 2007/0156665 A1* | 7/2007 | Wnek ................. | G06F 17/3071 |
| 2007/0162408 A1* | 7/2007 | Ma .................... | G06F 17/30613 706/48 |
| 2008/0005693 A1* | 1/2008 | Oliver .................. | G06F 9/4443 715/781 |
| 2008/0162302 A1* | 7/2008 | Sundaresan ........ | G06Q 30/0201 705/7.29 |
| 2011/0119210 A1* | 5/2011 | Zhang ................. | G06N 99/005 706/12 |

(Continued)

*Primary Examiner* — Robert W Beausoliel, Jr.
*Assistant Examiner* — Pedro J Santos
(74) *Attorney, Agent, or Firm* — Jefferson IP Law, LLP

(57) ABSTRACT

An application classifier classifies applications using latent semantic indexing (LSI) vectors of the applications. The application classifier uses a machine-learned model generated based on pairs of LSI vectors of positive and negative training sets of applications, where the positive training set includes applications within a desired category and the negative training set includes applications outside of the desired category. For a given application, the application classifier determines whether the application belongs to the desired category based on similarity of an LSI vector of the application and LSI vectors of positive and negative exemplar applications, as determined by the machine-learned model. If the LSI vector of the application is similar to an LSI vector of at least one positive exemplar application and not similar to an LSI vector of any of the negative exemplar applications, the application is determined to belong to the desired category.

16 Claims, 10 Drawing Sheets

(56) References Cited

U.S. PATENT DOCUMENTS

| | | | |
|---|---|---|---|
| 2011/0191344 A1* | 8/2011 | Jin | G06F 17/30 707/739 |
| 2013/0290319 A1* | 10/2013 | Glover | G06F 17/3053 707/723 |
| 2015/0169759 A1* | 6/2015 | Ronen | G06F 17/30572 707/706 |

* cited by examiner

| Exemplars | Threshold Scores | Similarity Scores 309 | |
|---|---|---|---|
| P1 (Positive) | .70 | .75 | 309A |
| P2 (Positive) | .75 | .71 | |
| P3 (Positive) | .60 | .55 | |
| N1 (Negative) | .80 | .85 | 309B |
| N2 (Negative) | .80 | .35 | |
| N3 (Negative) | .85 | .23 | |

LATENT SEMANTIC INDEXING IN APPLICATION CLASSIFICATION

CROSS-REFERENCE TO RELATED APPLICATION

This application claims the benefit of U.S. Provisional Patent Application No. 61/922,641, filed Dec. 31, 2013, which is incorporated herein by reference in its entirety.

BACKGROUND

This disclosure relates generally to classification of entities, and more particularly to classifying applications for application search.

In recent years, use of computers, smartphones, and other Internet-connected devices has grown exponentially. Correspondingly, the number of available applications for such devices has also grown. Today, many diverse applications can be accessed on any number of different devices, including, but not limited to, smartphones, personal computers, wearable devices, refrigerators, automobiles, and televisions. These diverse applications can include business-driven applications, games, educational applications, news applications, shopping applications, efficiency applications, messaging applications, video chatting applications, media streaming applications, social networking applications, and so much more.

Given the wide diversity of applications, it is often difficult to find applications that are similar to one another. Application search systems may search for applications by searching for words in titles, descriptions, and other textual content associated with the applications. However, end users typically perceive applications as being similar if the applications perform similar functions. As the functionality of an application is not necessarily well represented by individual words (e.g., keywords), it may be difficult for application search systems to determine if two applications perform similar functions.

Figure 1:
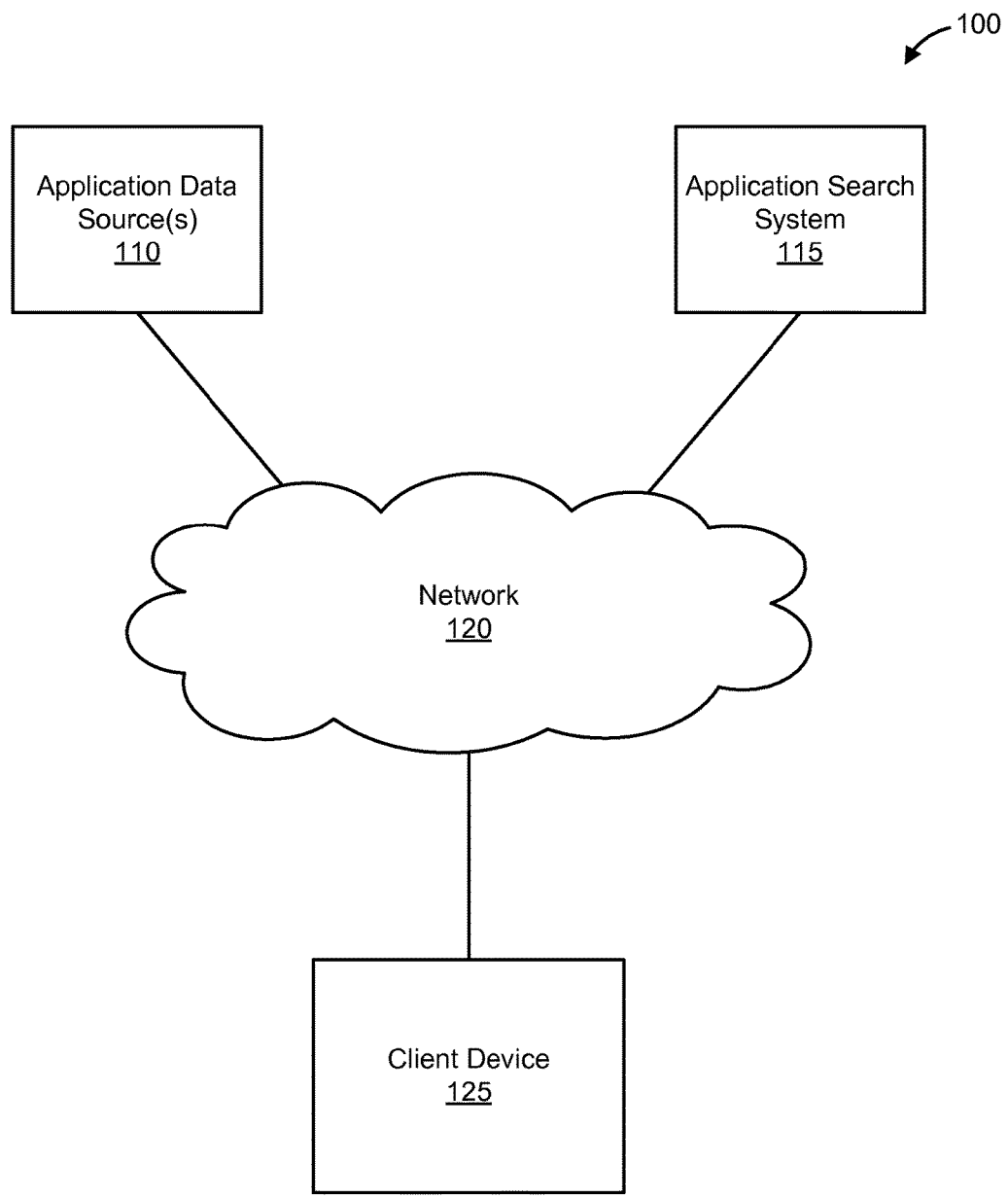
FIG. 1 illustrates an environment for identifying applications and generating search results, according to one embodiment.

The figures depict various embodiments of the techniques of the present disclosure for purposes of illustration only. One skilled in the art will readily recognize from the following discussion that alternative embodiments of the structures and methods illustrated herein may be employed without departing from the principles of the techniques described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed. It is noted that wherever practicable similar or like reference numbers may be used in the figures and may indicate similar or like functionality.

Configuration Overview

An application classifier determines whether an arbitrary application belongs in a category of applications. An application is a program executed on a computing device that performs various functions. Functions performed by an application include providing restaurant reviews, managing internal memory, taking pictures, web browsing, interfacing with a social network, and so forth. An application category represents a set of conceptually similar applications, determined by their similarity to one or more applications specified as belonging to the category. For example, an application category is a set of applications conceptually related to applications a user perceives as belonging to, or representative of, the category. More generally, an application category represents, or corresponds to, one or more conceptually similar applications. The application classifier uses latent semantic indexing (LSI) feature vectors (hereinafter, "LSI vectors") of applications to classify the applications. The classifier uses a trained computer model (e.g., a gradient-boosted decision tree model) to generate scores representing, or indicating, similarity (e.g., conceptual similarity) between two applications. Stated another way, the scores represent values of a similarity metric associated with the two applications. The computer model is trained with a positive training set of applications within the category and a negative training set of applications outside of the category. LSI vectors for pairs of applications included within the positive and negative training sets are input to a learner (e.g., a machine learner) to generate the computer model. In other words, the applications included in the positive and negative training sets are grouped into pairs of applications. Each of the two applications included within each pair of applications is selected from one of the positive and negative training sets. For each such pair of applications, two LSI vectors, each LSI vector corresponding to one of the two applications included within the pair, are provided to the learner to generate the computer model. In some examples, training scores associated with each pair of applications are also input to the learner to generate the computer model. As explained in greater detail below, a training score for a pair of applications may indicate whether both applications of the pair belong to a particular category, and, in some cases, the degree of confidence in whether one or more of the applications belong to the category.

In one embodiment, the computer model is applied to pairs of LSI vectors of a plurality of applications. Positive exemplar applications and negative exemplar applications (or positive and negative exemplars) are selected (e.g., manually using user judgment and/or automatically), where a positive exemplar is an application within the category and a negative exemplar is an application outside of the category. Each pair of LSI vectors includes an LSI vector for an application to be classified and an LSI vector for a positive or negative exemplar. The model determines a similarity score for each pair of LSI vectors indicating similarity of the LSI vectors (and thus similarity of the corresponding applications). In some examples, using the model, search results are selected from the plurality of applications. Each application in the search results is selected based on whether the LSI vector of the application and at least one positive exemplar's LSI vector have a similarity score above a corresponding threshold, or threshold score, while the LSI vector of the application and the LSI vectors of each of the negative exemplars have similarity scores below corresponding thresholds, or threshold scores. The search results described above may also be referred to as exemplar search results. As explained in greater detail below, in some examples, one or more of the search results may be subsequently used as positive or negative exemplar applications, as specified by a user.

In another embodiment, a set of search results is selected from a corpus of applications based on search terms received from a user. The search results are presented to the user, and the user selects positive exemplar applications belonging to a desired category and negative exemplar applications not belonging to the desired category. Based on LSI vectors associated with the positive and negative exemplar applications, a second set of search results is selected from the corpus of applications. The second set of search results includes applications whose LSI vectors are less than a threshold distance from an LSI vector of at least one positive exemplar application but outside a threshold distance from LSI vectors of all of the negative exemplar applications.

System Architecture

FIG. 1 is a high-level block diagram illustrating a typical environment 100 used for identifying applications and generating search results. The operations described herein may be performed by one or more computing systems. Referring to FIG. 1, the environment 100 includes one or more application data source(s) 110, an application search system 115, and a client device 125. Each of the application data source(s) 110, application search system 115, and client device 125 communicate with one another via a network 120, such as the Internet.

The one or more application data source(s) 110 provide data regarding applications. The application data source(s) 110 may be any suitable data provider, including an application publisher, an operator of an application store, an application developer, an application catalog, a website (e.g., blogs, application review sites, etc.), and the like. In one embodiment, the environment 100 includes a number of (i.e., multiple) application data source(s) 110, each having its own distinct interface, content, and update rate. In this example, one or more of the multiple application data source(s) 110 may provide data relating to the applications.

The application search system 115 performs searches for applications. The application search system 115 retrieves and aggregates application data associated with applications from the application data source(s) 110 via the network 120. When the application search system 115 receives search queries from end users, the application search system 115 uses the application data to identify search results for the received search queries. The application search system 115 generates a set of search results to return to an end user, which includes an identifier of each application determined to match the user's search query. The application search system 115 may also retrieve additional information relating to each application from the application data, such as a description, a price, a list of compatible platforms, reviews, or a thumbnail image associated with the application. The application search system 115 may include the additional information in the set of search results displayed to the end user.

The application search system 115 also uses the application data to classify applications. The application search system 115 extracts a feature vector (i.e., an LSI vector) from the application data associated with each application. In other words, the application search system 115 generates (or computes) a feature vector for each application based on the application data (e.g., textual data within the application data) associated with the application. Alternatively, the application search system 115 may retrieve a previously generated feature vector for each application from the application data associated with the application. In any case, feature vectors of positive and negative training sets of applications are input to a learner to generate an application classifier. The application classifier uses a computer model trained with the positive and negative training sets to generate scores representing, or indicating, similarity (e.g., conceptual similarity) of two applications. As previously described, the scores may represent values of a similarity metric associated with the two applications. Based on the similarity of a test application to exemplar applications known to belong or not belong to a category, the application search system 115 determines whether the test application belongs to the category.

In one embodiment, the application search system 115 uses the application classifier to select search results. When a search query is received from an end user, the application search system 115 selects search results matching the user's search query that are determined to belong to the application category. In this case, the application search system 115, or a third-party system, may provide an application search engine configured to search a specified category of applications, rather than an entire corpus of applications. For example, a children's entertainment company may leverage the functionality of the application search system 115 to provide a search engine for children's game applications. In this example, a user associated with the children's entertainment company interacts with the application search system 115 to train a classifier to identify applications belonging to the "children's game" category. When search queries are submitted to the application search system 115 by end users of the children's entertainment company's system, the application search system 115 uses the trained classifier to identify applications matching the users' queries and belonging to the specified category.

In another embodiment, the application search system 115 identifies information to include in the search results based on application classification. For example, the application search system 115 selects which types of application data to display to users with the search results. For applications belonging to a specified category, the application search system 115 may not display reviews with the search results, for example. As another example, the application search system 115 selects advertisements to be displayed with a list of search results belonging to a particular category. In this case, an advertiser may interact with the application search system 115 to define a category of applications with which the advertiser desires to display an advertisement. When the application search system 115 selects search results in response to user search queries based on the relevance of the search results to the search queries, the application search system 115 determines whether the search results belong to the advertiser's category. If so, the application search system 115 selects the advertiser's ad for display with the search results. Alternatively, the application search system 115 may use behavioral data of a user to train a model for categorizing applications. User behavioral data may include previous search queries submitted by the user, information about applications installed on the user's devices, application ratings provided by the user, and so forth. Using the trained model, the application search system 115 targets advertising to the user.

In yet another embodiment, the application search system 115 provides application browsing functionality based on application categories. The application search system 115 identifies a set of applications belonging to each of a number of categories using the trained model. Users of the application search system 115 can browse the categories to view information about the corresponding applications, optionally without explicitly entering a search query.

The client device 125 transmits search queries and other user inputs to the application search system 115 via the network 120 and displays search results received from the application search system 115 to an end user. The client device 125 may also receive other information or objects to be displayed with the search results, such as advertisements. In one embodiment, the client device 125 is configured to display a user interface to the end user for submitting search queries and selecting training applications for training an application classifier. The client device 125 may be any device having computing and networking functionality, such as a desktop computer, a laptop computer, a smartphone, a tablet, a set-top box, or an Internet TV.

Figure 2:
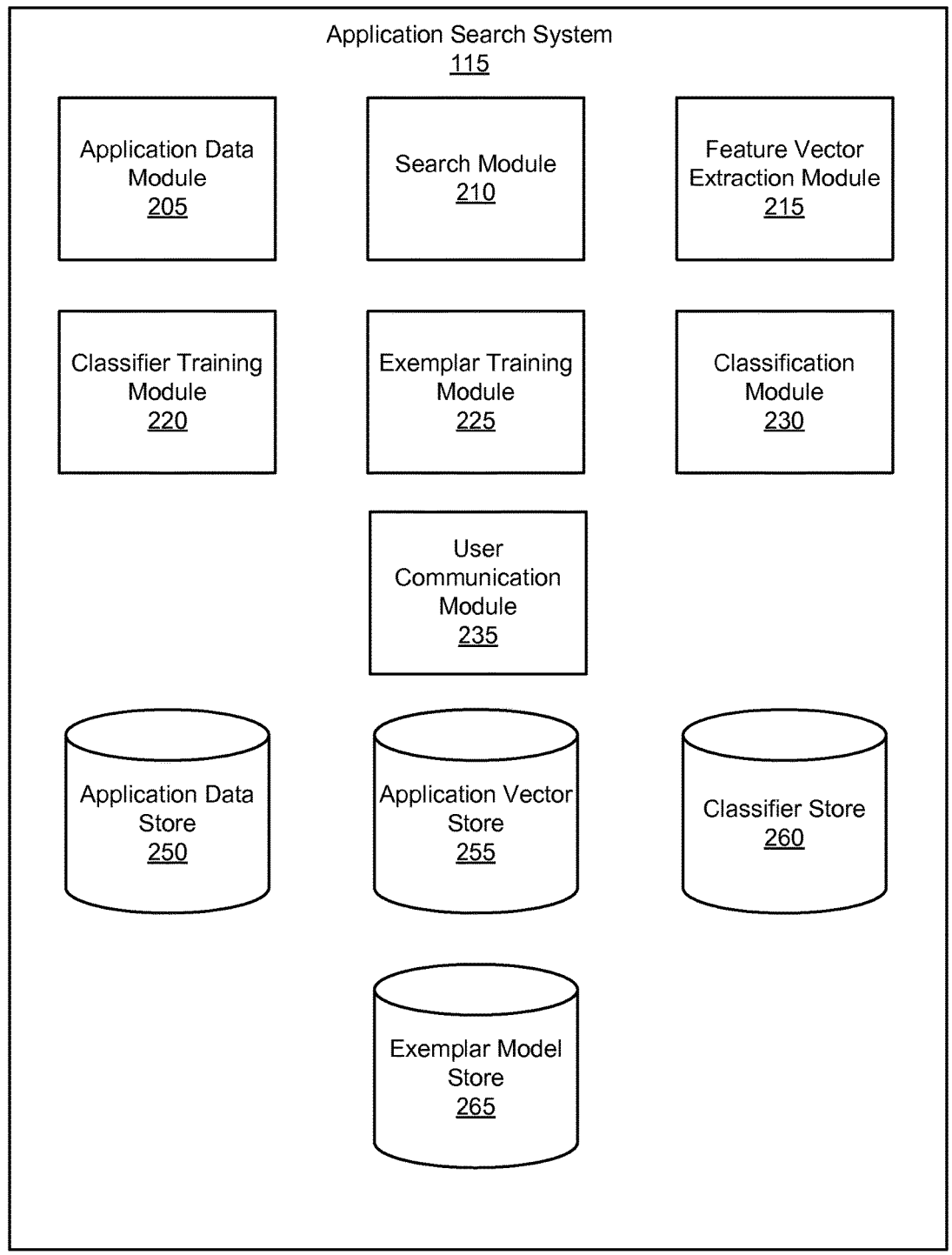
FIG. 2 is a block diagram illustrating modules within an application search system, according to one embodiment.

FIG. 2 is a block diagram illustrating modules within the application search system 115, according to one embodiment. In the embodiment shown in FIG. 2, the application search system 115 includes an application data module 205, a search module 210, a feature vector extraction module 215, a classifier training module 220, an exemplar training module 225, a classification module 230, and a user communication module 235. In this example, the application search system 115 also includes an application data store 250, an application vector store 255, a classifier store 260, and an exemplar model store 265. Other embodiments of the application search system 115 may include fewer, additional, or different modules, and the functionality may be distributed differently among the modules.

The application data module 205 receives application data for a plurality of applications from the application data source(s) 110. The received application data include application data associated with each application. The overall set of application data associated with the plurality of applications, or the plurality of applications itself, is referred to herein as an application corpus, a corpus of applications, or a corpus of application data. The application data support application search, and may include application titles, descriptions, reviews, and/or web pages describing applications. The application data module 205 extracts text strings from the retrieved application data associated with each application. In addition to, or instead of, the text strings, the application data module 205 may extract non-textual data from the retrieved application data, such as, e.g., structured and/or numeric data. The application data module 205 aggregates the application data associated with each application and stores the aggregated application data in the application data store 250, such that the application data associated with each application is stored along with an identifier of the corresponding application.

The search module 210 performs searches for applications. When search terms are received from a user, the search module 210 processes the search terms and queries the application data store 250 to identify a set of search results. The search results include identifiers of applications determined to match the search terms based on the application data associated with the matching applications. The search module 210 sends the search results to the client device 125 for display to the user.

The feature vector extraction module 215 extracts feature vectors (i.e., LSI vectors) from the application data for each of a plurality of applications. Stated another way, the feature vector extraction module 215 generates (or computes) a feature vector for each application based on the application data (e.g., textual data within the application data) for the application. Generally speaking, the feature vectors for the applications are generated by applying a latent semantic indexing (LSI) algorithm to terms related to the applications (e.g., textual terms included in the application data for the applications). In some examples, the feature vector extraction module 215 generates the feature vectors for the applications by applying the LSI algorithm to a matrix representation of the terms related to the applications. Specifically, to generate the feature, or LSI vectors, the feature vector extraction module 215 first generates term vectors and processes the term vectors to create the LSI vectors. The feature vector extraction module 215 parses textual data (e.g., one or more text strings, or subsets thereof) included in the application data to extract individual terms relating to each application. In some examples, the feature vector extraction module 215 extracts a subset of the individual terms relating to each application, e.g., including terms from one or more fields of the application data for each application. In these examples, the one or more fields of the application data may be fields that are deemed relevant for purposes of classifying applications. The feature vector extraction module 215 generates a term vector for each application by scoring the extracted terms associated with the application. In one embodiment, for each term present in the corpus of application data (or, e.g., each keyword present in the application corpus, after stemming and removal of stop words), the feature vector extraction module 215 scores the term based on its presence or absence in data associated with an application. In another embodiment, the feature vector extraction module 215 generates term vectors by a term frequency-inverse document frequency (TF-IDF) calculation. That is, the feature vector extraction module 215 assigns a score to each term indicating the number of occurrences of the term in the data associated with an application relative to the frequency of the term's appearance in a dictionary, such as the application corpus or an English language dictionary. The feature vector extraction module 215 may further weight the score for each term based on the source of the term in the application data associated with the application. In some examples, scores of one or more terms in the application data may correspond to zero, or null scores, resulting in relatively lower, or no scores being assigned to the terms. For example, terms extracted from an application's title or description may be weighted more heavily than terms extracted from reviews. The result of scoring the terms is a 1×N term vector for each application, where N is the number of terms or keywords in the corpus of application data.

The feature vector extraction module 215 concatenates term vectors for a set of M applications into an N×M term-application matrix. Using singular value decomposition (SVD), the feature vector extraction module 215 reduces the rank of the term-application matrix to generate an M×K matrix, where K<N. The columns in the resultant reduced matrix correspond to orthogonal concept dimensions, or concepts, of an application concept space representing the application corpus, while each row corresponds to an application. The number of concepts determined by the feature vector extraction module 215 varies according to the implementation, and in one embodiment is 100. Because the feature vector extraction module 215 reduces the rank of the term-application matrix, the columns of the reduced matrix represent significant concepts in the application corpus. While derived from individual terms in the term vectors (i.e., from individual columns in the N×M term-application matrix of applications and corresponding term frequency values), the concepts in the reduced matrix are not expressly labeled, and represent unstated semantic similarity between terms associated with the applications. Semantically, a human may be able to identify a label for a particular concept, such as relating to "games," "restaurants," or "reviews," but any such labels are imprecise interpretations of the concepts, which are derived from latent associations between term occurrences in the term vectors. Specifically, the rows of the reduced dimensionality matrix represent vectors within, i.e., projections into, the K-dimensional concept space of the text associated with the applications. A matrix of the concepts and the terms, in turn, represents projections of the terms into the concept space. The feature vector extraction module 215 extracts each row of the reduced matrix as a feature vector (i.e., an LSI vector) for a corresponding application, and stores the feature vectors in the application vector store 255.

The classifier training module 220 uses the LSI vectors to generate a trained computer model configured to output scores representing similarity of two applications. The functionality of the classifier training module 220 is described with respect to FIG. 3A, which illustrates an example process performed by the classifier training module 220. The classifier training module 220 receives two training sets of applications: a positive training set, including applications in a desired category, and a negative training set, including applications not in the desired category. The positive and negative training sets may be determined by any suitable method, such as by individual human selection, based on user behavioral data, or using another authoritative selection process with high confidence. For example, a user may explicitly select applications to be included in one or more of the positive and negative training sets. As another example, user ratings (e.g., on a rating scale of one to five stars) are used to select the positive and/or negative training sets. In this example, applications receiving a five-star rating from a user are included in the positive training set and applications receiving a one-star user rating are included in the negative training set. For each of the training applications, the classifier training module 220 receives a corresponding LSI vector. Thus, the classifier training module 220 receives a set of in-category training vectors I={$I_1$, $I_2$ ... $I_n$} corresponding to the positive training applications and a set of out-of-category training vectors O={$O_1$, $O_2$ ... $O_m$} corresponding to the negative training applications. To generate the classifier, the classifier training module 220 takes the Cartesian product of the set I∪O with itself to select pairs of LSI vectors corresponding to the applications in the training sets. In this embodiment, the Cartesian product generates pairs comprising each permutation of the training sets, including ($I_1$, $I_1$), ($I_1$, $O_1$), ($O_1$, $O_m$) and so forth. In another embodiment, pairs of the same application vectors are not included ($I_1$, $I_1$).

Figure 3A:
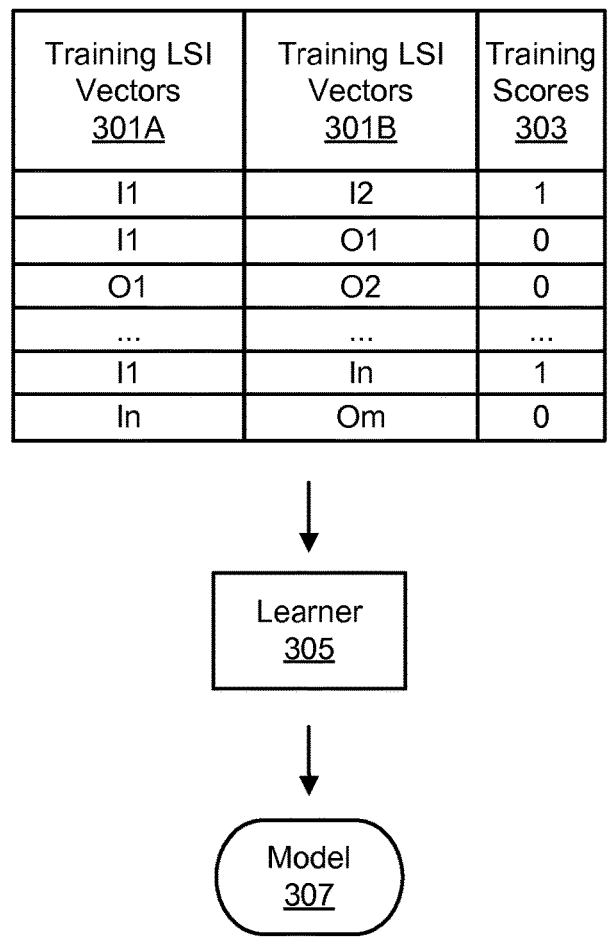
FIG. 3A illustrates a process for training an application classifier, according to one embodiment.

The classifier training module 220 determines a training score for each pair of training applications. FIG. 3A illustrates an example of how training scores 303 are generated for each of a plurality of pairs of training LSI vectors (i.e., LSI vectors for training applications) 301A, 301B. If both applications in a pair were selected from the positive training set (e.g., the pair of in-category LSI vectors $I_1$ and $I_2$), the classifier training module 220 assigns a training score of 1 to the pair. Otherwise, the classifier training module 220 assigns a training score of 0 to the pair. For example, as shown in FIG. 3A, the pair of in-category vector $I_1$ and out-of-category vector $O_1$ receives a training score 303 of 0, and the pair of out-of-category vector $O_1$ and out-of-category vector $O_2$ receives a training score 303 of 0. In other embodiments, the classifier training module 220 assigns a training score within a range, which may be based on a confidence value that the application in each training set is correctly categorized. For example, training applications that are categorized by a user may be given a higher training score than training applications that are automatically categorized. The training score for an automatically categorized training application may also be based on a confidence value associated with the automatic categorization methodology used to categorize the training application.

The classifier training module 220 inputs the training LSI vectors 301A, 301B and corresponding training scores 303 to a learner 305 (e.g., a machine-learner), which generates a model 307 based on the training LSI vectors 301A, 301B and training scores 303. Based on the training LSI vectors 301A, 301B and the corresponding training scores 303 for the positive and negative training sets, the learner 305 identifies which concept dimensions are relevant for the particular category of applications of the in-group (i.e., positive) training set, as well as the relative magnitude of the LSI vectors of applications belonging to the category in each of the relevant concept dimensions. In one embodiment, the model 307 is a boosted decision tree model (e.g., a gradient-boosted decision tree model). The model 307 determines scores quantifying similarity of a pair of applications relative to a category of applications. The model 307 scores the similarity of a pair of applications using the LSI vectors associated with the pair of applications. The score is typically a value between 0 and 1, though any range of values may be used. The classifier training module 220 stores the learned model 307 in the classifier store 260.

The exemplar training module 225 identifies applications, termed exemplar applications, or exemplars, to be compared with an unknown application using the learned model 307 to categorize the unknown application. The exemplar training module 225 identifies positive and negative exemplar applications, each having a corresponding LSI vector generated by the feature vector extraction module 215. A positive exemplar is an application belonging to a desired category, while a negative exemplar is an application outside of the desired category. The positive and negative exemplars may be initially selected by various means, and then subsequently refined as described further below. In one embodiment, the positive exemplars are selected by a user as being representative of applications within a desired category, and the negative exemplars are selected by the user as being representative of applications outside of the desired category. The sets of positive and negative exemplars may include applications in the training sets, or may include different applications selected by the user. The exemplars may also be automatically selected, for example based on search results for terms related to the desired category, or by any other suitable means.

The exemplar training module 225 also determines a positive threshold score for each of the positive exemplars and a negative threshold score for each of the negative exemplars. The threshold scores, or threshold similarity scores (or simply thresholds), are used to determine whether an application is similar to the exemplars. In one embodiment, the threshold scores are the same for each positive exemplar and for each negative exemplar. In another embodiment, the threshold scores vary across one or more of the positive and negative exemplars. In still another embodiment, the threshold scores are specified by a user of the application search system 115. The exemplar training module 225 stores the positive and negative exemplars and the corresponding threshold scores in the exemplar model store 265.

Figures 3B, 3C:
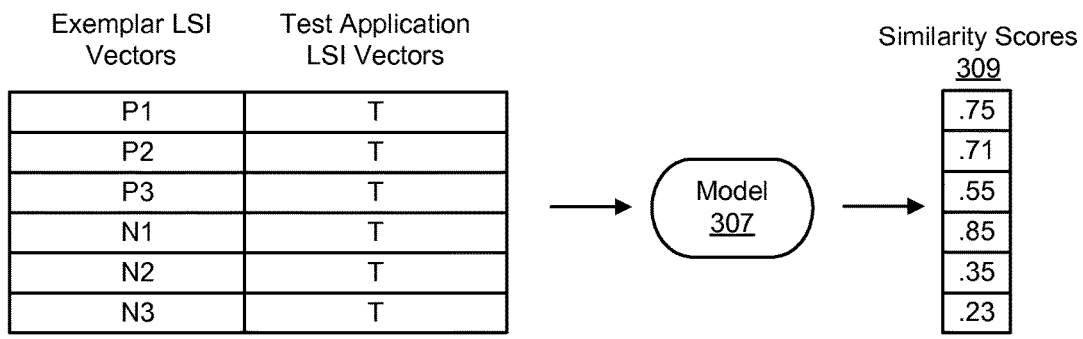
FIGS. 3B and 3C illustrate an example comparison between a test application and positive and negative exemplar applications.

The classification module 230 uses the trained model 307 and the exemplars to determine whether a test (i.e., an arbitrary) application belongs to the category defined using the classifier training module 220 and the exemplar training module 225. For a test application to be categorized, the classification module 230 compares the test application to the positive and negative exemplars using the model 307. The classification module 230 generates pairs of LSI vectors for input to the model 307 that include the LSI vector of the test application and an LSI vector of an exemplar. For example, FIG. 3B illustrates a set of LSI vector pairs, in which each pair includes an LSI vector of a positive exemplar P1, P2, or P3 or a negative exemplar N1, N2, or N3, as well as the LSI vector of the test application T. Although FIG. 3B illustrates the test application being compared against three positive and three negative exemplars, the classification module 230 may compare the test application to additional or fewer exemplars and typically compares the test application against each positive and each negative exemplar. For each LSI vector pair input to the model 307, the model 307 determines a similarity score 309 representing the similarity of the corresponding applications.

The classification module 230 compares the similarity scores 309 to the threshold scores associated with each exemplar. If the similarity score between the test application and an exemplar is above the threshold score for the exemplar, the classification module 230 determines the test application to be similar to the exemplar. The classification module 230 classifies the test application as belonging to the category of the positive exemplars if the test application is similar to at least one scored positive exemplar and dissimilar to all of the scored negative exemplars. If the test application is not similar to any positive exemplar, the classification module 230 determines the test application does not belong to the category. Similarly, if the test application is similar to any negative exemplar, the classification module 230 determines that the test application does not belong to the category. For example, FIG. 3C illustrates a comparison between threshold scores associated with exemplars and the similarity scores 309 between the test application and the exemplars illustrated in FIG. 3B. In contrast to FIG. 3B, in FIG. 3C, P1, P2, P3, N1, N2, and N3 refer to the corresponding positive and negative exemplar applications, rather than the LSI vectors for the applications. As shown in FIG. 3C, the similarity score 309A between the test application and the positive exemplar P1 exceeds the threshold score associated with the positive exemplar P1. However, the similarity score 309B between the test application and the negative exemplar N1 exceeds the threshold score associated with the negative exemplar N1. Thus, since the test application is similar to the negative exemplar N1, the classification module 230 determines that the test application does not belong to the application category.

The user communication module 235 enables communication between a user and the application search system 115. The user communication module 235 receives search queries from the client device 125 and sends search results matching the search queries to the client device 125 for display to a user. The user communication module 235 may also receive user selections of applications for inclusion in the positive and negative training sets, selections of positive and negative exemplars, and threshold similarity scores for each exemplar.

Classifying Applications

Figure 4:
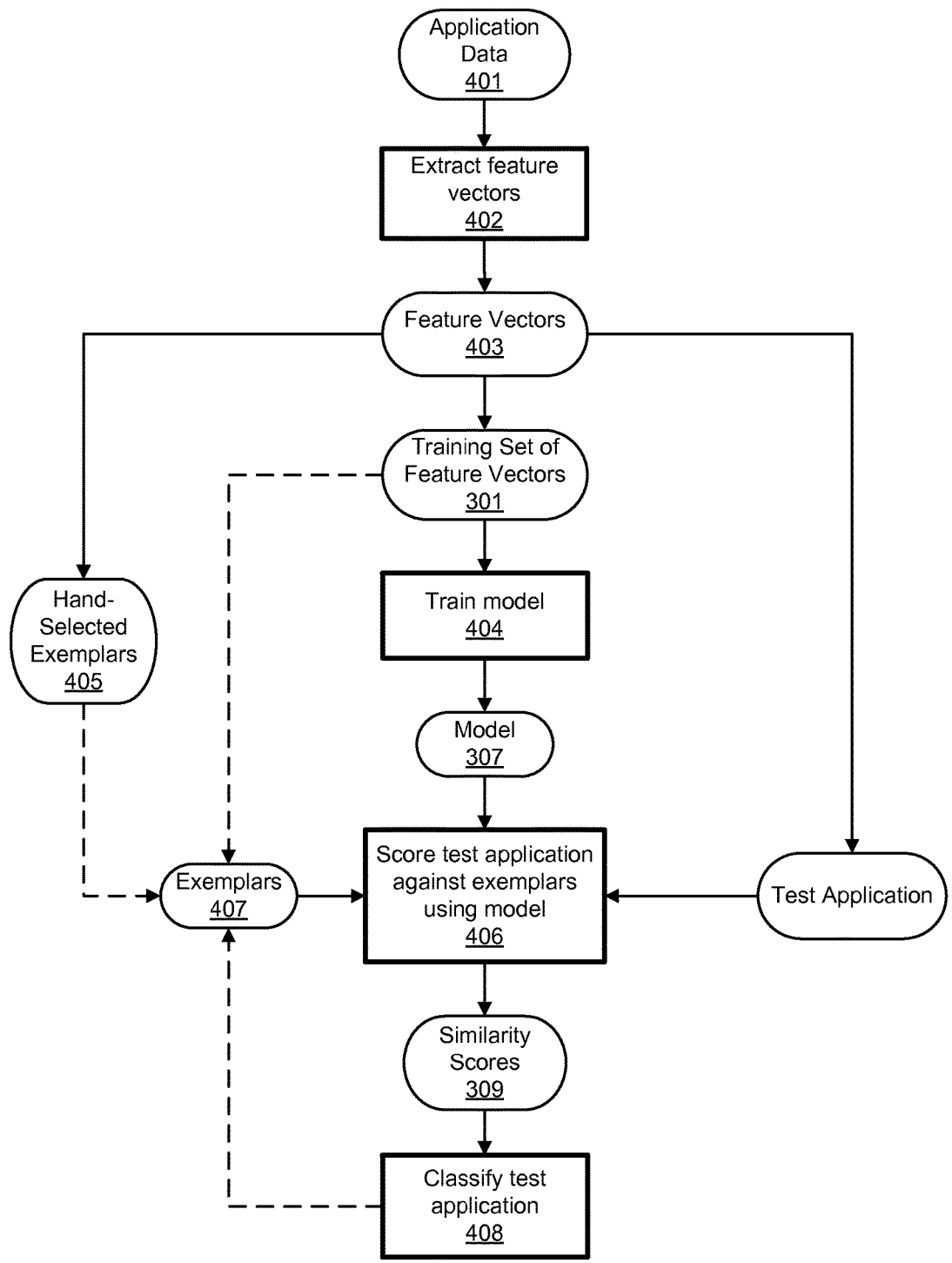
FIG. 4 is a data flow diagram illustrating a process for classifying applications, according to one embodiment.

FIG. 4 is a data flow diagram illustrating a process for classifying applications, according to one embodiment. Other embodiments may perform the steps of the process in different orders, and can include different or additional steps. In one embodiment, the process illustrated in FIG. 4 is performed by the application search system 115.

The application search system 115 receives application data 401 associated with a plurality of applications, and extracts feature vectors (i.e., LSI vectors) from the application data 401 (402). Each feature vector 403 resulting from the extraction (402) corresponds to an application in the plurality of applications.

The application search system 115 uses a training set of feature vectors, i.e., the training LSI vectors 301A, 301B, to train the model 307 (404). The training set of the training LSI vectors 301A, 301B includes LSI vectors corresponding to positive training applications and negative training applications. These training applications may be selected by a user training the model 307, identified from user behavioral data, or otherwise generated by an automated method with a degree of confidence. The application search system 115 trains the model 307 (404) using pairs of the LSI vectors in the training set of the training LSI vectors 301A, 301B and the corresponding training scores 303 indicating the similarity of the corresponding applications in each pair (i.e., whether the applications both belong to a particular category).

Based on the training (404), the model 307 is configured to output a similarity score for each pair of LSI vectors input to the model 307. To determine whether a test (i.e., an arbitrary) application is in the category designated by the training set of the training LSI vectors 301A, 301B, the application search system 115 uses the model 307 to compare the test application to positive and negative exemplars 407. The exemplars 407 may include at least a portion of the training set of the training LSI vectors 301A, 301B, hand-selected exemplars 405 chosen by a user who is training the model 307, or automatically categorized applications (not shown). For a test application, the application search system 115 scores the test application against at least one of the positive exemplars and one or more of the negative exemplars using the model 307 (406). The similarity scores 309 resulting from the scoring (406) indicate similarity of the test application to each of the exemplars.

Based on the similarity scores 309, the application search system 115 classifies the test application (408). The application search system 115 compares the similarity scores 309 against threshold scores for corresponding exemplars. If the similarity score between the test application and at least one positive exemplar exceeds the threshold score of the positive exemplar, while the similarity score between the test application and each of the negative exemplars is less than the corresponding threshold scores, the application search system 115 classifies the test application as belonging to the category of the positive exemplars (408). However, if the similarity score between the test application and each of the positive exemplars is less than the corresponding threshold scores, or if the similarity score between the test application and at least one of the negative exemplars is greater than the corresponding threshold score, the application search system 115 determines that the test application does not belong to the category (408).

In one embodiment, if the user training the model 307 determines that the test application was classified improperly, the user may add the test application to the exemplars 407. For example, if the application search system 115 determines that the test application belongs to the category, but the user training the model 307 does not want the category to encompass the test application (e.g., because the categorization by the model 307 is incorrect), the user designates the test application as a negative exemplar. The application search system 115 adds the test application to the exemplars 407 and scores subsequent test applications against the test application as a negative exemplar. Conceptually, this has the effect of cutting out a part of, or narrowing, the previously defined in-category portion of the concept space of the applications. Thus, if an application is determined to be similar to the test application, the application search system 115 determines that the application does not belong to the category. As another example, if the application search system 115 determines that the test application does not belong to the category, but the user training the model 307 desires the category to encompass the test application, the user designates the test application as a positive exemplar. In a similar manner as described above, this has the effect of adding to, or expanding, the previously defined in-category portion of the concept space of the applications. The application search system 115 scores subsequent test applications against the test application as a positive exemplar, thereby determining that applications similar to the test application may belong to the category. However, if applications similar to the test application score above the threshold score of a negative exemplar (i.e., resulting in a false negative, or incorrect out-of-category classification), the threshold score for that negative exemplar may be increased to reduce the likelihood of similar false negative classifications.

Figure 5:
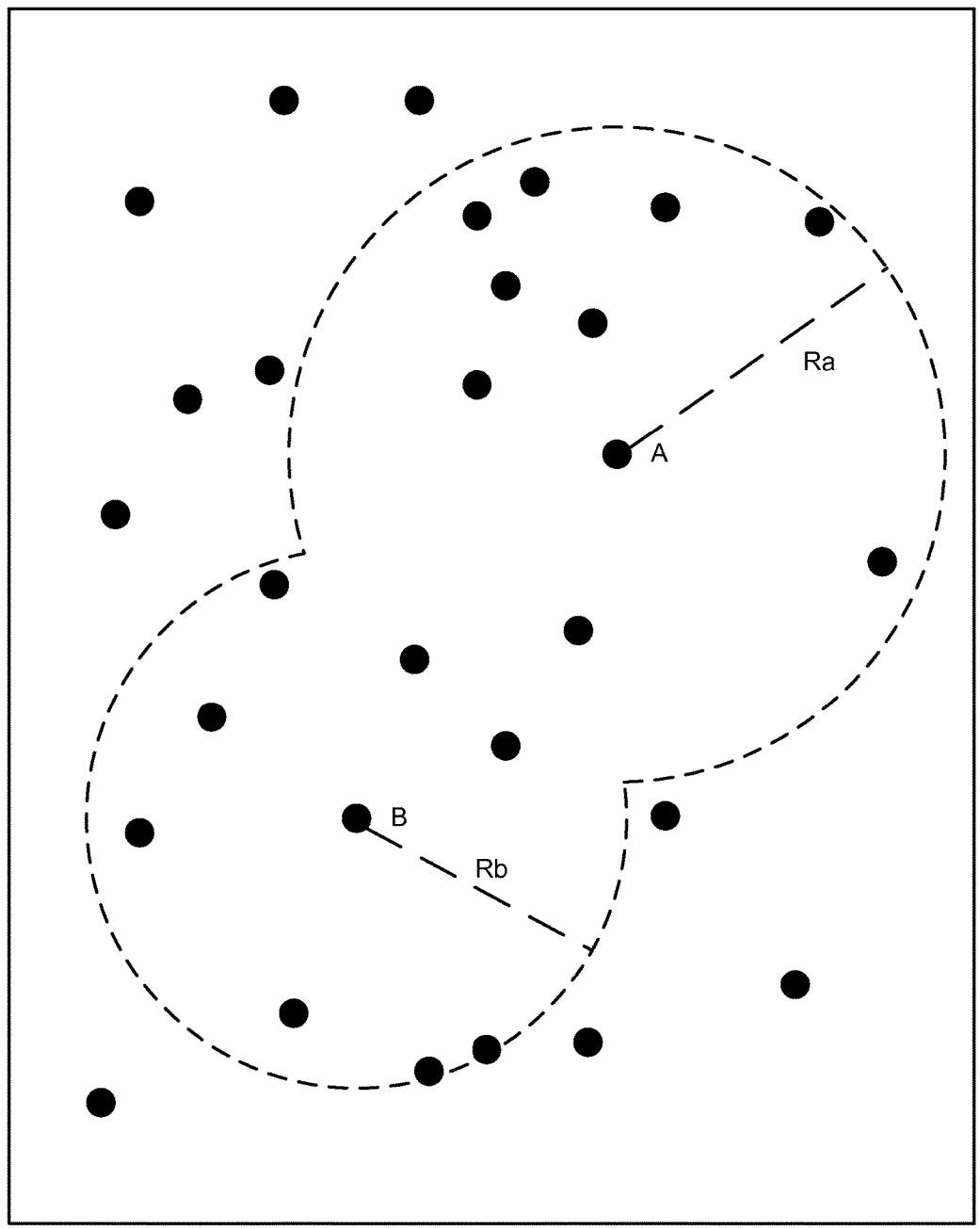
FIGS. 5-7 illustrate generating an example application classifier based on positive and negative exemplar applications.
Figure 6:
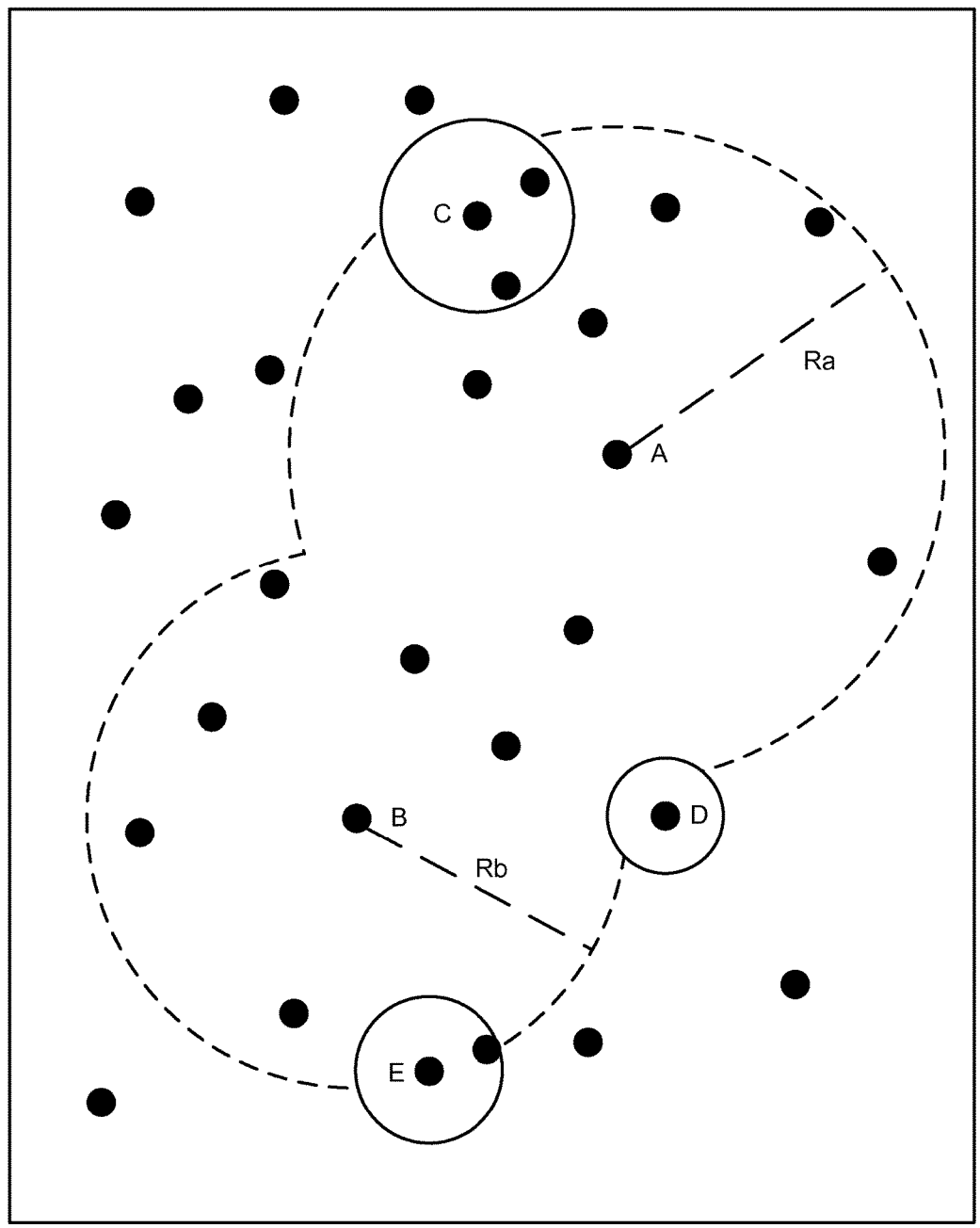
Figure 7:
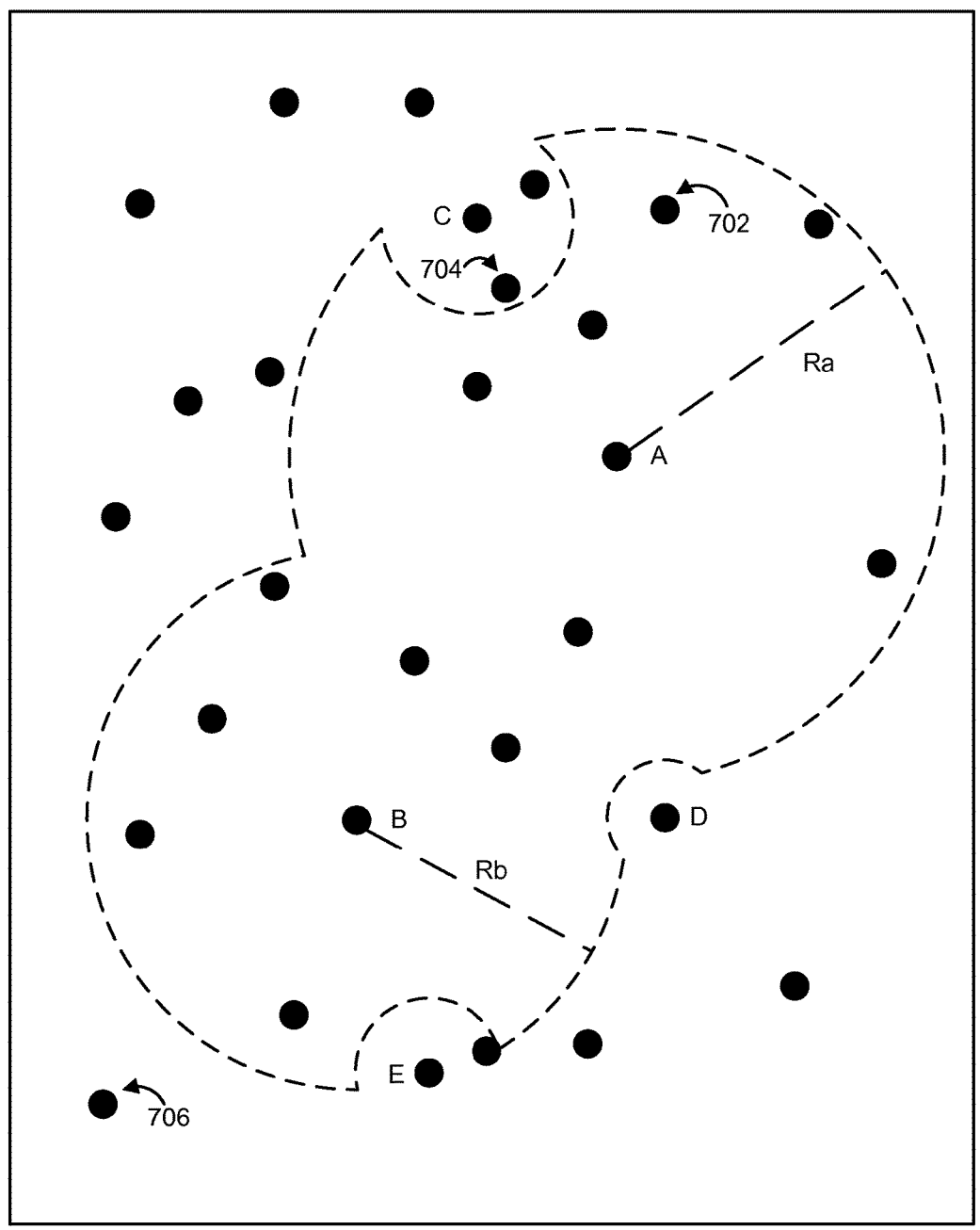

An example set of application feature, i.e., LSI vectors is illustrated in FIGS. 5-7. These figures illustrate a two-dimensional projection of an application concept space. However, the two-dimensional space is shown merely for illustration purposes; the application concept space may have many more dimensions than two (e.g., one hundred). Each dot in FIGS. 5-7 represents an application positioned at a location in the application concept space specified by a corresponding LSI vector. As illustrated in FIG. 5, two positive exemplar applications A and B have been selected. The radii Ra and Rb represent portions of the concept space in which applications are determined to be similar to the exemplars A and B. For any application inside the radius of an exemplar, the similarity score between the application and the exemplar exceeds the threshold score of the exemplar. While described here as a "radius," the concept space of LSI vectors corresponding to similarity scores exceeding the threshold score of an exemplar is typically not circular, and represents various aspects of the LSI vector space, as interpreted relative to the model 307.

FIG. 6 illustrates the concept space shown in FIG. 5, in which three negative exemplar applications C, D, and E have been selected. Like the positive exemplars A and B, each negative exemplar application has a corresponding radius representing portions of the concept space in which applications are determined to be similar to the negative exemplars.

Furthermore, FIG. 7 illustrates an example classification of applications based on their similarity to the exemplars. To ascertain if an arbitrary application belongs to the category of the positive exemplars, the application search system 115 determines whether the LSI vector of the application is similar to an LSI vector of at least one of the positive exemplars. For example, the similarity score between an application 702 and the exemplar A (i.e., between their respective LSI vectors) is above a threshold, or threshold score, defined for the exemplar A, as represented by the application 702 falling within the radius Ra illustrated in FIG. 7. Since the similarity score between the application 702 and each of the negative exemplars C, D, and E is below the threshold scores of the negative exemplars (as represented by the application 702 being outside of the radii of each of the negative exemplars), the application 702 is determined to belong to the category including the positive exemplars A and B. As another example, the similarity score between an application 704 and the positive exemplar A is also above the threshold score of the exemplar A, since the application 704 falls within the radius Ra. However, the similarity score between the application 704 and the negative exemplar C is above the threshold score associated with the exemplar C, as represented by the application 704 falling within the radius associated with the exemplar C. Thus, since the application 704 is similar to a negative exemplar, the application 704 is determined to not belong to the category of the positive exemplars. In yet another example, the similarity score between an application 706 and the positive exemplars A and B is less than the respective threshold scores of the exemplars. Thus, the application 706 is determined to not belong to the category of the positive exemplars.

Figure 8:
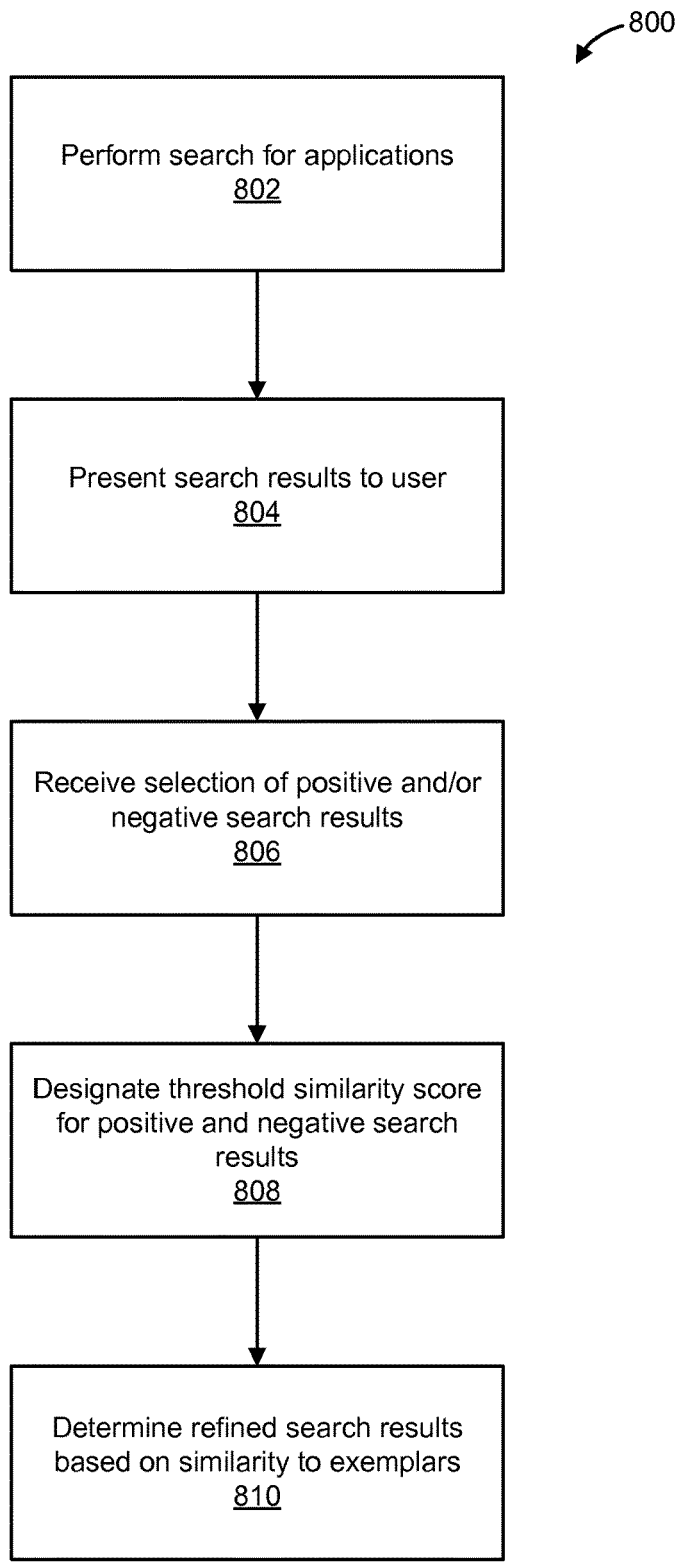
FIG. 8 is a flowchart illustrating a method for generating a list of search results, according to one embodiment.

FIG. 8 illustrates an example method 800 for generating a list of search results using an application classifier. The method 800 may be used to define a category of applications. For example, an advertiser interacting with the application search system 115 can use the method 800 to define a category of applications with which the advertiser's advertisements will be displayed. As another example, a partner leveraging the functionality of the application search system 115 to provide a customized application search can use the method 800 to define a category of applications to be searched when end users submit search queries via the partner's system. As yet another example, user behavioral data may be used to customize application search to a user's interests using the method 800. In one embodiment, the steps of the method 800 shown in FIG. 8 are performed by the application search system 115.

The application search system 115 performs a search for applications using search terms received from a user (802). Based on the search terms, the application search system 115 selects a set of search results, e.g., from the corpus of applications. In one embodiment, the application search system 115 provides, or presents, the search results for display to the user (804).

The application search system 115 receives selections of positive applications and/or negative applications within the search results (806), i.e., positive and/or negative search results, or exemplars. The positive search results are applications within a desired category, while the negative search results are applications outside of the desired category. For example, positive search results selected by an advertiser are applications with which the advertiser desires to associate an advertisement, and negative search results are applications with which the advertiser does not want to associate advertisements. As another example, positive search results selected by a partner are applications the partner desires to include in search results provided to end users, while negative search results are applications the partner wishes to exclude from the search results. In yet another example, positive search results selected (e.g., automatically) for a user are applications the user has shown interest in (e.g., based on ratings provided by the user), and negative search results are applications in which the user has not indicated interest.

The application search system 115 designates a threshold similarity score for each of the positive and negative search results to define similarity (e.g., of an arbitrary application) to each positive and negative search result (808). In one embodiment, the application search system 115 designates a first threshold, or threshold score, for each application in the positive search results and a second threshold, or threshold score, for each application in the negative search results. However, the application search system 115 may alternatively designate a different threshold, or threshold score, for each application in the positive and negative search results.

The application search system 115 selects or determines a second set of search results (which may be referred to as refined search results) from the corpus of applications based on similarity of each application in the corpus to the positive and negative search results (810). In one embodiment, the application search system 115 determines similarity scores between the applications in the corpus and the positive and negative search results using a trained model, such as the model 307. To select the applications in the second set of search results (810), the application search system 115 determines for each application in the corpus whether the similarity score between the application and at least one of the positive search results is greater than the threshold score of the corresponding positive search result, and whether the similarity scores between the application and all of the negative search results are less than the corresponding threshold scores of the negative search results.

The application search system 115 may display the second set of search results to the user who selected the positive and negative search results. The user can verify whether the second set of search results includes search results belonging to the desired category. For example, the user may select additional negative search results or remove positive search results if the second set of search results includes undesired applications. Similarly, the user can select additional positive search results or remove negative search results if the second set of search results does not include desired applications. The application search system 115 may then select yet another set of search results based on the additional search results selected by the user (810).

In one embodiment, the application search system 115 selects the second set of search results (810) in response to receiving a second search query. In this case, the application search system 115 selects the applications in the second set of search results based on the second search query and the similarity of the applications in the corpus of applications to the positive and negative search results. For example, an end user submits a search query via a partner's search engine configured to search a specified category of applications. In response, the application search system 115 selects search results belonging to the specified category that match the user's search query.

In this manner, the application search system 115 described above with reference to FIGS. 1-8 represents an example of an application search system that performs (e.g., using an application classifier) a method for classifying applications. As explained above, the method includes receiving application data associated with each of a plurality of applications, computing an LSI vector for each of the plurality of applications based on the application data associated with the application, and determining a training subset of the plurality of applications. In this example, the training subset includes at least one application of the plurality of applications that belongs to a category and at least one application of the plurality of applications that does not belong to the category. The method further includes generating a computer model based on the LSI vectors for the applications (e.g., some or all applications) in the training subset. Additionally, the method includes determining an exemplar subset of the plurality of applications. In this example, the exemplar subset includes at least one application of the plurality of applications that belongs to the category and at least one application of the plurality of applications that does not belong to the category. The method also includes determining whether an application of the plurality of applications belongs to the category based on the computer model, the LSI vector for the application, and the LSI vector for one or more applications in the exemplar subset (i.e., the LSI vector for each of one or more applications in the exemplar subset).

In some examples, the training subset includes a positive training set that includes the at least one application that belongs to the category and a negative training set that includes the at least one application that does not belong to the category. In these examples, generating the computer model based on the LSI vectors for the applications in the training subset includes determining one or more pairs of applications in the training subset. Specifically, each pair of applications includes two applications in the training subset, and each of the two applications of each pair of applications is included in (i.e., selected from) one of the positive training set and the negative training set. Also in these examples, generating the computer model based on the LSI vectors for the applications in the training subset further includes determining a training score for each of the one or more pairs of applications, and generating the computer model based on the LSI vectors for the applications of each pair of applications and the training score for each pair of applications.

In some examples, the training score described above indicates whether both of the two applications of the pair of applications belong to the category. In other examples, the training score further indicates a degree of confidence associated with one or both of the two applications of the pair of applications belonging to the category or not belonging to the category.

In still other examples, determining whether the application of the plurality of applications belongs to the category based on the computer model, the LSI vector for the application, and the LSI vector for the one or more applications in the exemplar subset includes, for each of one or more applications in the exemplar subset, inputting the LSI vector for the application of the plurality of applications and the LSI vector for the application in the exemplar subset into the computer model, and computing a similarity score for the application of the plurality of applications and the application in the exemplar subset based on the computer model and the LSI vectors for the application of the plurality of applications and the application in the exemplar subset. In these examples, the above-described determination further includes determining whether the application of the plurality of applications belongs to the category based on the similarity scores for the application and the one or more applications in the exemplar subset.

In some examples, determining whether the application of the plurality of applications belongs to the category based on the similarity scores for the application and the one or more applications in the exemplar subset includes determining whether the application of the plurality of applications is similar to at least one application in the exemplar subset that belongs to the category based on one or more of the similarity scores for the applications (i.e., for the application of the plurality of applications and the one or more applications in the exemplar subset that belong to the category), and determining whether the application of the plurality of applications is similar to at least one application in the exemplar subset that does not belong to the category based on one or more of the similarity scores for the applications (i.e., for the application of the plurality of applications and the one or more applications in the exemplar subset that do not belong to the category). In these examples, the method further includes, in the event the application of the plurality of applications is similar to at least one application in the exemplar subset that belongs to the category and not similar to any applications in the exemplar subset that do not belong to the category, determining that the application belongs to the category, and otherwise determining that the application does not belong to the category.

In other examples, one or more of determining whether the application of the plurality of applications is similar to at least one application in the exemplar subset that belongs to the category and determining whether the application of the plurality of applications is similar to at least one application in the exemplar subset that does not belong to the category includes comparing one or more of the similarity scores for the applications to a threshold value (e.g., a threshold similarity score, or threshold score).

In some examples, the method for classifying applications further includes providing an indication of the determination of whether the application of the plurality of applications belongs to the category to a user, receiving a user input that indicates that the determination is incorrect, and, in response to receiving the user input, adding the application of the plurality of applications to the exemplar subset. In these examples, whether the application in the exemplar subset belongs to the category or does not belong to the category is specified by the user input.

In other examples, the above-described method may further include determining whether another application of the plurality of applications belongs to the category based on the computer model, the LSI vector for the other application, and the LSI vector for one or more applications in the exemplar subset, including the application of the plurality of applications added to the exemplar subset.

In still other examples, the method for classifying applications further includes receiving a search query, determining search results based on the search query, wherein, in the event the application of the plurality of applications belongs to the category, the search results include the application of the plurality of applications, and providing the search results for display to a user.

Although embodiments have been described with respect to an LSI vector based classifier for classifying applications, other entities may be classified using the methods and systems described herein. For example, the LSI vector based classifier described herein may be used to classify search queries or documents by methods similar to those used for classifying applications. This LSI vector based classifier permits comparisons between objects (here, applications) using semantic meaning derived from data about the objects (here, application data), without relying on automated analysis of the objects themselves.

Computing Machine Architecture

Figure 9:
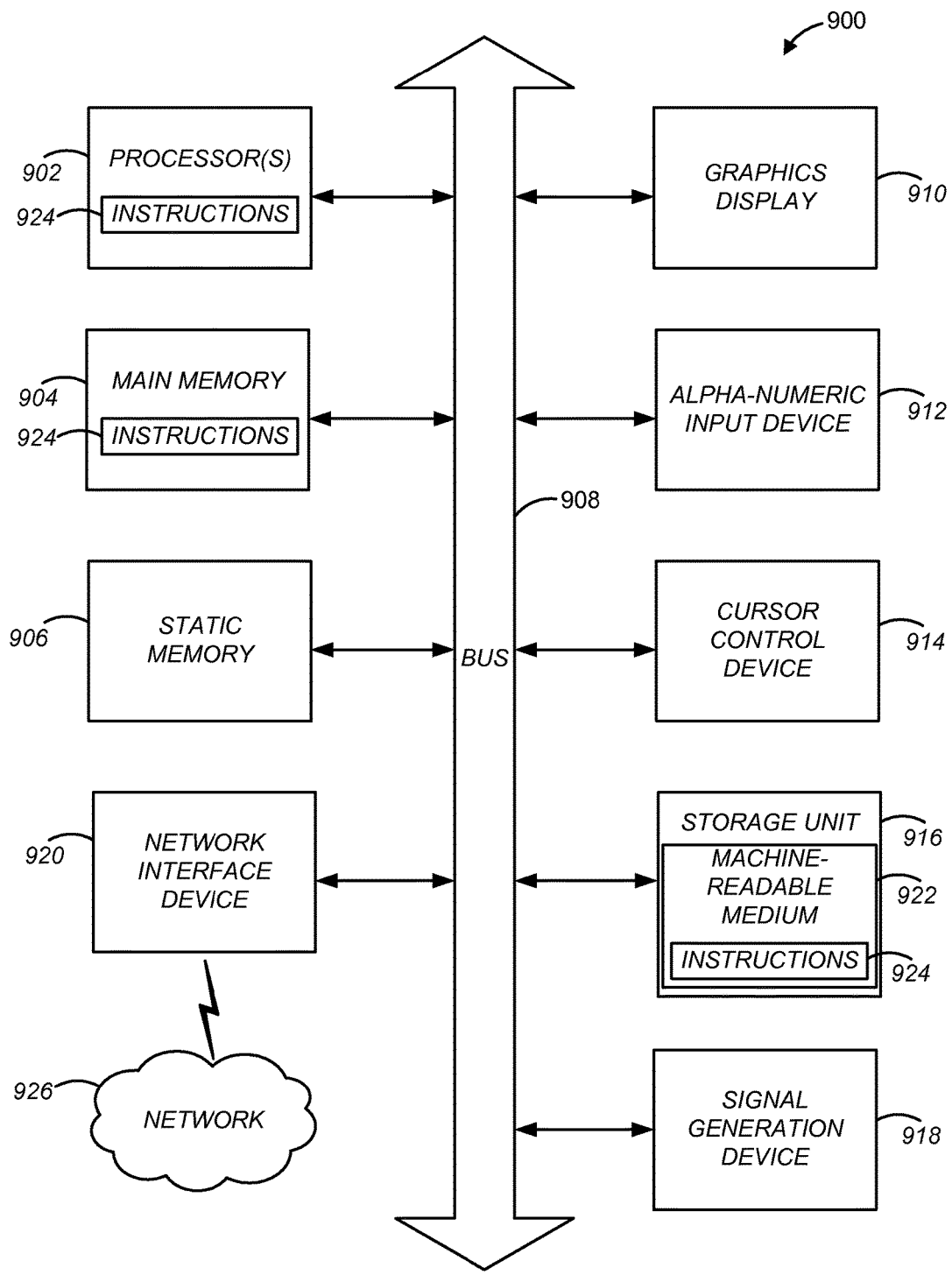
FIG. 9 is a block diagram illustrating components of a machine able to read instructions from a machine-readable medium and execute them in a processor (or controller), according to one embodiment.

FIG. 9 is a block diagram illustrating components of an example machine able to read instructions from a machine-readable medium and execute them in a processor (or controller), as an example of the application data source(s) 110, application search system 115, or client device 125. Specifically, FIG. 9 shows a diagrammatic representation of a machine in the example form of a computer system 900 within which instructions 924 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing the instructions 924 (sequentially or otherwise) that specify actions to be taken by that machine. Further, while only a single machine is illustrated, the term "machine" shall also be taken to include any collection of machines that individually or jointly execute the instructions 924 to perform any one or more of the methodologies discussed herein.

The example computer system 900 includes one or more processor(s) 902 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 904, and a static memory 906, which are configured to communicate with each other via a bus 908. The computer system 900 may further include a graphics display 910 (e.g., a plasma display panel (PDP), a liquid crystal display (LCD), a projector, or a cathode ray tube (CRT) display). The computer system 900 may also include an alphanumeric input device 912 (e.g., a keyboard), a cursor control device 914 (e.g., a mouse, a trackball, a joystick, a motion sensor, or other pointing instrument), a storage unit 916, a signal generation device 918 (e.g., a speaker), and a network interface device 920, which also are configured to communicate via the bus 908.

The storage unit 916 includes a machine-readable medium 922 on which is stored the instructions 924 (e.g., software) embodying any one or more of the methodologies or functions described herein. The instructions 924 (e.g., software) may also reside, completely or at least partially, within the main memory 904 or within the processor(s) 902 (e.g., within a processor's cache memory) during execution thereof by the computer system 900, the main memory 904 and the processor(s) 902 also constituting machine-readable media. The instructions 924 (e.g., software) may be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, or associated caches and servers) able to store instructions (e.g., the instructions 924). The term "machine-readable medium" shall also be taken to include any medium that is capable of storing instructions (e.g., the instructions 924) for execution by the machine and that cause the machine to perform any one or more of the methodologies disclosed herein. The term "machine-readable medium" includes, but is not limited to, data repositories in the form of solid-state memories, optical media, and magnetic media.

Additional Configuration Considerations

The foregoing description of the embodiments of the techniques of this disclosure has been presented for the purpose of illustration; it is not intended to be exhaustive or to limit the techniques to the precise forms disclosed. Persons skilled in the relevant art can appreciate that many modifications and variations are possible in light of the above disclosure.

Some portions of this disclosure describe the embodiments of the disclosed techniques in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosed techniques may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosed techniques may also relate to a product that is produced by a computing process described herein. Such a product may comprise information resulting from a computing process, where the information is stored on a non-transitory, tangible computer readable storage medium and may include any embodiment of a computer program product or other data combination described herein.

Moreover, the language used in the specification has been principally selected for readability and instructional purposes, and it may not have been selected to delineate or circumscribe the disclosed subject matter. It is therefore intended that the scope of the techniques disclosed herein be limited not by this detailed description, but rather by any claims that issue on an application based hereon. Accordingly, the disclosure of the embodiments of the techniques is intended to be illustrative, but not limiting, of the scope of the techniques, which is set forth in the following claims.

What is claimed is:

1. A method of classifying applications, the method comprising:

receiving application data associated with each of a plurality of applications;

computing, by at least one processor, a latent semantic indexing (LSI) vector for each of the plurality of applications based on the application data associated with the plurality of applications;

determining, by the at least one processor, a training subset of the plurality of applications, wherein the training subset includes at least one first application that belongs to a category and at least one second application that does not belong to the category, and wherein the training subset comprises a positive training set that includes the at least one first application that belongs to the category and a negative training set that includes the at least one second application that does not belong to the category;

generating, by the at least one processor, a computer model based on the LSI vectors for applications in the training subset, wherein generating the computer model includes determining pairs of applications in the training subset, wherein each of the pairs of applications includes two applications, and wherein each of the two applications of each of the pairs of applications is selected from one of the positive training set and the negative training set, determining a training score for each of the pairs of applications, wherein each of the determined training scores is assigned to a respective pair of the pairs of applications in the training subset, and generating the computer model based on the LSI vectors for the two applications of each of the pairs of applications and the training score assigned to each of the pair of applications;

determining, by the at least one processor, an exemplar subset of the plurality of applications, wherein the exemplar subset includes at least one third application that belongs to the category and at least one fourth application that does not belong to the category;

determining, by the at least one processor, a set of applications of the plurality of applications belonging to the category based on the computer model, LSI vector for set of applications, and LSI vector for one or more applications in the exemplar subset, wherein the determining the set of applications of the plurality of applications belonging to the category comprises:

identifying at least one first radius each corresponding to the at least one third application based on LSI vector for the at least one third application, identifying at least one second radius each corresponding to the at least one fourth application based on LSI vector for the at least one fourth application, and determining the set of applications which have LSI vector being inside a first area defined by the at least one first radius and being outside a second area defined by the at least one second radius, receiving a search query from electronic device; and transmitting a search result including at least one of the set of applications belonging to the category associated with the search query to the electronic device for displaying.

2. The method of claim 1, wherein the training score indicates whether both of the two applications of the pairs of applications belong to the category.

3. The method of claim 2, wherein the training score further indicates a degree of confidence associated with one or both of the two applications of the pairs of applications belonging to the category or not belonging to the category.

4. The method of claim 1, wherein the determining the set of applications of the plurality of applications belonging to the category comprises:
inputting the LSI vector for the set of applications of the plurality of applications and the LSI vector for the one or more application in the exemplar subset into the computer model, and computing a similarity score for the set of applications based on the computer model, the LSI vector for the set of applications and the LSI vector for the one or more application; and
identifying the set of applications of the plurality of applications belonging to the category based on the similarity score.

5. The method of claim 4, wherein determining the set of applications of the plurality of applications belonging to the category based on the similarity score for the application and the one or more applications in the exemplar subset comprises:
determining that the set of applications of the plurality of applications is similar to the at least one third application in the exemplar subset that belongs to the category based on one or more of the similarity score;
determining that the set of applications of the plurality of applications is not similar to the at least one fourth application in the exemplar subset that does not belong to the category based on one or more of the similarity score; and
determining that the set of applications belongs to the category.

6. The method of claim 5, wherein the set of applications is determined to be similar to the at least one third application or not to be similar to the at least one fourth application based on a comparison between one or more of the similarity score and a threshold value.

7. The method of claim 1, further comprising:
providing an indication of the determination that the set of applications of the plurality of applications belongs to the category to a user;
receiving a user input that indicates that the determination is incorrect; and
in response to receiving the user input, determining that a specific application belongs to the category, wherein whether the specific application belongs to the category or does not belong to the category is specified by the user input.

8. The method of claim 7, further comprising:
determining whether another application of the plurality of applications belongs to the category based on the computer model, the LSI vector for the other application, and the LSI vector for one or more applications in the exemplar subset, including the specific application.

9. A system for classifying applications, the system comprising:
at least one processor;
wherein the at least one processor is configured to:
receive application data associated with each of a plurality of applications,
compute a latent semantic indexing (LSI) vector for the each of the plurality of applications based on the application data associated with the plurality of applications,
determine a training subset of the plurality of applications, wherein the training subset includes at least one application that belongs to a category and at least one application that does not belong to the category, and generate a computer model based on the LSI vectors for the applications in the training subset, and wherein the training subset comprises a positive training set that includes the at least one first application that belongs to the category and a negative training set that includes the at least one second application that does not belong to the category,
generate a computer model based on the LSI vectors for the plurality of applications in the training subset to (i) determine pairs of applications in the training subset, wherein each of the pairs of applications includes two applications, and wherein each of the two applications of each of the pairs of applications is selected from one of the positive training set and the negative training set, (ii) determine a training score for each of the pairs of applications, wherein each of the determined training scores is assigned to a respective pair of the pairs of applications in the training subset, and (iii) generate the computer model based on the LSI vectors for the two applications of each of the pairs applications and the training score assigned to each of the pairs of applications,
determine an exemplar subset of the plurality of applications, wherein the exemplar subset includes at least one third application that belongs to the category and at least one fourth application that does not belong to the category, and
determine a set of applications of the plurality of applications belonging to the category based on the computer model, the LSI vector for the set of applications, and LSI vector for one or more applications in the exemplar subset, and
wherein, the at least one processor is further configured to, when determining the set of applications of the plurality of applications belonging to the category:
identify at least one first radius each corresponding to the at least one third application based on LSI vector for the at least one third application,
identify at least one second radius each corresponding to the at least one fourth application based on LSI vector for the at least one fourth application, and
determine the set of applications which have LSI vector being inside a first area defined by the at least one first radius and being outside a second area defined by the at least one second radius,
receive search query from electronic device, and
transmit a search result including at least one of the set of applications belonging to the category associated with the search query to the electronic device for displaying.

10. The system of claim 9, wherein the training score indicates whether both of the two applications of the pairs of applications belong to the category.

11. The system of claim 9, wherein to determine the set of applications of the plurality of applications belonging to the category comprises:
input the LSI vector for the set of applications of the plurality of applications and the LSI vector for the one or more application in the exemplar subset into the computer model, and compute a similarity score for the set of applications based on the computer model, the LSI vector for the set of applications and the LSI vectors for the applications; and identifying the set of applications of the plurality of applications belonging to the category based on the similarity score.

12. The system of claim 11, wherein to determine the set of applications of the plurality of applications belonging to the category based on the similarity score for the application and the one or more applications in the exemplar subset comprises:

determine that the set of applications of the plurality of applications is similar to the at least one third application in the exemplar subset that belongs to the category based on one or more of the similarity score;

determine that the set of applications of the plurality of applications is not similar to the at least one fourth application in the exemplar subset that does not belong to the category based on one or more of the similarity score; and determine that the set of applications belongs to the category.

13. The system of claim 12, wherein the set of applications is determined to be similar to the at least one third application or not to be similar to the at least one fourth application based on a comparison between one or more of the similarity score and a threshold value.

14. The system of claim 9, wherein the at least one processor is further configured to:

provide an indication of the determination that the set of applications of the plurality of applications belongs to the category to a user; and receive a user input that indicates that the determination is incorrect, in response to receiving the user input, determine that a specific application belongs to the category, wherein whether the specific application belongs to the category or does not belong to the category is specified by the user input.

15. The system of claim 14, wherein the at least one processor is configured to:

determine whether another application of the plurality of applications belongs to the category based on the computer model, the LSI vector for the other application, and the LSI vector for one or more applications in the exemplar subset, including the specific application of the plurality.

16. A non-transitory computer-readable storage medium comprising instructions that cause one or more computing devices, when executed by at least one processor, to perform a method of:

receiving application data associated with each of a plurality of applications based on the search query;

computing, by at least one processor, a latent semantic indexing (LSI) vector for the each of the plurality of applications based on the application data associated with the plurality of applications;

determining, by the at least one processor, a training subset of the plurality of applications, wherein the training subset includes at least one application that belongs to a category and at least one application that does not belong to the category, and wherein the training subset comprises a positive training set that includes the at least one first application that belongs to the category and a negative training set that includes the at least one second application that does not belong to the category;

generating, by the at least one processor, a computer model based on the LSI vectors for the plurality of applications in the training subset to (i) determine pairs of applications in the training subset, wherein each of the pairs of applications includes two applications, and wherein each of the two applications of each of the pairs of applications is selected from one of the positive training set and the negative training set, (ii) determine a training score for each of the pairs of applications, wherein each of the determined training scores is assigned to a respective pair of the pairs of applications in the training subset, and (iii) generate the computer model based on the LSI vectors for the two applications of each of the pairs applications and the training score assigned to each of the pairs of applications;

determining, by the at least one processor, an exemplar subset of the plurality of applications, wherein the exemplar subset includes at least one third application that belongs to the category and at least one fourth application that does not belong to the category;

determining, by the at least one processor, a set of application of the plurality of applications belonging to the category based on the computer model, the LSI vector for the set of applications, and LSI vector for one or more applications in the exemplar subset, wherein the determining the set of applications of the plurality of applications belonging to the category comprises:

identifying at least one first radius each corresponding to the at least one third application based on LSI vector for the at least one third application, identifying at least one second radius each corresponding to the at least one fourth application based on LSI vector for the at least one fourth application, and determining the set of applications which have LSI vector being inside a first area defined by the at least one first radius and being outside a second area defined by the at least one second radius, receiving search query from electronic device; and transmitting a search result including at least one of the set of applications belonging to the category associated with the search query to the electronic device for displaying.

* * * * *